United States Patent
Michel et al.

(10) Patent No.: US 8,170,476 B2
(45) Date of Patent: May 1, 2012

(54) EMISSION POWER CONTROL FOR PACKET TRANSMISSION

(75) Inventors: Jürgen Michel, München (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 1134 days.

(21) Appl. No.: 11/794,055

(22) PCT Filed: Dec. 20, 2005

(86) PCT No.: PCT/EP2005/056947
§ 371 (c)(1),
(2), (4) Date: Jun. 22, 2007

(87) PCT Pub. No.: WO2006/067135
PCT Pub. Date: Jun. 29, 2006

(65) Prior Publication Data
US 2008/0159255 A1 Jul. 3, 2008

(30) Foreign Application Priority Data
Dec. 22, 2004 (DE) .......................... 10 2004 061 904

(51) Int. Cl.
*H04B 7/185* (2006.01)
*H04B 7/00* (2006.01)
*H04B 1/04* (2006.01)
*H01Q 11/12* (2006.01)

(52) U.S. Cl. .................. 455/13.4; 455/522; 455/127.2

(58) Field of Classification Search .................. 455/13.4, 455/522, 127.2
See application file for complete search history.

(56) References Cited

U.S. PATENT DOCUMENTS

| | | | |
|---|---|---|---|
| 5,887,245 A * | 3/1999 | Lindroth et al. | 455/69 |
| 5,991,627 A * | 11/1999 | Honkasalo et al. | 455/437 |
| 6,144,860 A * | 11/2000 | Komatsu | 455/522 |
| 7,369,521 B2 * | 5/2008 | Frederiksen et al. | 370/318 |
| 2002/0016158 A1* | 2/2002 | Shibuya et al. | 455/232.1 |
| 2002/0126694 A1* | 9/2002 | Kahola | 370/465 |
| 2004/0137931 A1* | 7/2004 | Sarkar et al. | 455/522 |
| 2005/0186983 A1 | 8/2005 | Iochi | |

FOREIGN PATENT DOCUMENTS

| | | |
|---|---|---|
| WO | 02/080403 | 10/2002 |
| WO | 2004/042992 | 5/2004 |
| WO | WO 2004/042992 | 5/2004 |
| WO | 2004/047338 | 6/2004 |

OTHER PUBLICATIONS

3GPP TS 25.214 V6. 1.0 (Dec 2004), "3rd Generation Partnership Project; Technical Specification Group Radio Access Network; Spreading and modulation (FDD) (Release6)." 2004.

(Continued)

*Primary Examiner* — Marisol Figueroa
(74) *Attorney, Agent, or Firm* — Staas & Halsey LLP (57) ABSTRACT

A method of transmitting data packets in a radio system between and emitter and a receiver. A nominal emission power for a data packet is determined according to a desired reception quality. The data packet is transmitted with an effective emission power. A new nominal emission power defined according to the reception quality for the transmission is calculated, taking into account the effectively applied emission power and the pre-determined nominal emission power. The data packet is retransmitted with the nominal emission power.

23 Claims, 4 Drawing Sheets

OTHER PUBLICATIONS

3GPP TS 25.214 V6. 1.0 (Dec 2004), "3rd Generation Partnership Project; Technical Specification Group Radio Access Network; Physical layer procedures (FDD) (Release6)." 2004.

"Universal Mobile Telecommunication System (UMTS); Spreading and modulation (FDD) (3GPP TS 25.213 version 6.1.0 Release 6) ETSI TS 125 213" ETSI Standards, European Telecommunications Standards Institute, Sophia-Antipo, FR, Bd. 3-R1, Nr. V610, Dec. 2004, XP014027619 ISSN: 0000-0001 pp. 7-12.

"Universal Mobile Telecommunications System (UMTS); Physical layer procedures (FDD) (3GPP TS 25.214 version 6.1.0 Release 6); ETSI TS 125 214" ETSI Standards, European Telecommunications Standards Institute, Sophia-Antipo, FR Bd. 3-R1, Nr. V610, Mar. 2004, XP014016703 ISSN: 0000-0001 pp. 3-31.

Copy of the German International Search mailed Oct. 5, 2006 (International Application No. PCT/EP20051056947).

* cited by examiner

EMISSION POWER CONTROL FOR PACKET TRANSMISSION

CROSS REFERENCE TO RELATED INVENTION

This application is based on and hereby claims priority to PCT Application No. PCT/EP2005/056947 filed on Dec. 20, 2005 and German Application No. 10 2004 061 904.2 filed on Dec. 22, 2004, the contents of which are hereby incorporated by reference.

BACKGROUND

The invention relates to a method for transmitting data packets in a radio system and a corresponding communication device, a base station and the corresponding radio system.

For future "Enhanced UMTS Uplink" (E-DCH), a packet-oriented transmission with fast Hybrid ARQ (HARQ) is used, similar to that already standardized for HSDPA. In contrast to HSDPA, the "Enhanced UMTS Uplink" is, however, subject to the fast power control as described in Release 99, The emission power to be used for each channel (Release 99 and E-DCH) is specified by power offsets for the DPCCH (Dedicated Physical Control Channel, reference channel). The power offsets are communicated to the mobile station by signaling (higher layer signaling) or by a defined method from reference data. This ensures that each channel on average achieves the required target error rate.

If the mobile station exceeds its maximum permitted emission power during the fast power control, the transmission signal is scaled. As with the fast power control, this scaling operates on a "slot basis" and does not change the power ratio of the channels relative to the reference channel.

Figure 1:
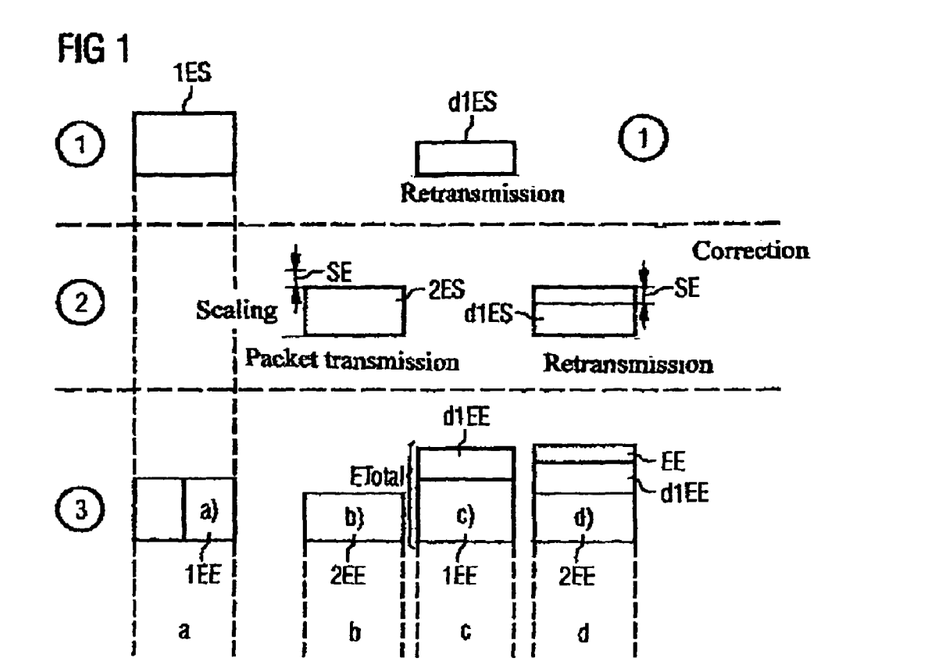
FIG. 1: Representation of a HARQ operation, with the transmitter being at the limit of emission power and an energy correction with a reduction of the retransmission power and a chase combining being used.

In Release 6, the transmission signal includes, in addition to one or more DPDCH(s) (Dedicated Physical Data Channel) and a DPCCH (Dedicated Physical Control Channel), also of one or more E-DPDCH(s) (Enhanced Dedicated Physical Data Channel). The slot-based scaling then effects an equivalent reduction in Release 6 of the total emission power at the terminal without changing the power ratio of the individual channels with respect to the DPCCH at the same time. The slot-based scaling is shown in FIG. 1. It takes place after the summing of the transmission signal.

Because in Release 6 the service quality of Release 99 DCH is prioritized compared with the service quality of the E-DCH channel, an E-DCH TTI based scaling that is performed at the start of the respective E-DCH TTIs is provided in addition to the slot-based scaling. Therefore, the following scaling process takes place in Release 6.

Scaling only of the E DCH channel (E-DCH TTI based) and scaling of the E DCH and DCH channels (slot based)

The main reason for the scaling is to prevent the mobile station disturbing the amplifier at the emission power limit, e.g. data transmission in the adjacent frequency bands, due to the non linearity. Possible causes for a power demand beyond the emission power limit are Burst-type occurrence of a transmission overlap of channels with packet characteristics (e.g. simultaneous transmission of an HSDPA ACK/NACK and an E-DCH data packet)

Change of the data rate of one or more transport channels, especially a change of the data rate on the DCH channel Deteriorating channel properties and thus increased requirement for emission power As described above, the E-DCH is a packet channel. In the case of power scaling, the transmitted packet is transmitted at lower energy than the target energy, which increases the block error rate of this transmission compared with the target block error rate.

It has already been specified in UMTD Release 99 that if a mobile station threatens to exceed its maximum emission power the power of all channels is scaled, i.e. uniformly reduced. In a case where in Release 6 (E-DCH) a packet transmission has to be scaled because of the power limit of the mobile station, a procedure equivalent to Release 99 is used as described. Additionally, "E-DCH only TTI based" scaling was proposed for the E-DCH, which functions similarly to the R99 scaling, but in this case only scales the E-DCH signal. During the transmission of the E-DCH packets it was therefore previously necessary to take account of the disadvantage of the scaling and thus of an increased block error rate compared with the target block error rate. The missing energy of a transmission during scaling is also not taken into account in a retransmission and thus also leads to an increase in the error rate during the retransmission.

The generation of UMTS signals, the emission power of which is scaled by amplification factors, is described in specification 25.213 v6.1.0, section 4.2, Details of emission power control and especially the calculation of the amplification factors are described in specification 25.214 v6.1.0, section 5.

Based on this related art, it is one possible object to create a possibility of transmitting a high transmission quality at a satisfactory transmission quality.

SUMMARY

For the transmission of a data packet from a transmitter to a receiver, the inventors propose determining a nominal emission power for this data packet. This determination takes place relative to a reception quality that should be present when the data packet is at the receiver.

Such a nominal emission power is, for example, particularly specified for each transmission and is signaled from the receiver to the transmitter.

Transmission of the data packet takes place at an effective emission power. The effective emission power can, for example, deviate from the nominal emission power because of certain boundary conditions.

A new nominal emission power is derived taking account of the effective applied emission power and the specified nominal emission power, with a retransmission of the data packet then taking place.

This method reduces interference and increases the transmission capacity, in that a new nominal emission power is used taking account of the "energy", already transmitted and the specified nominal values are not used.

In particular, the method has advantages if a difference between the effective emission power and nominal emission power is determined and this difference is added to a specified nominal emission power for the succeeding transmission.

An adaptation of the emission power can particularly take place only on feedback of the reception quality from the receiver. Furthermore, this adaptation of the emission power can take place once for the overall transmission of the data packet. As an alternative, it is proposed that the adaptation take place for each time slot. In this case, the transmission of the data packet takes place in a certain time interval which is divided into time slots.

The nominal emission power can be derived relative to the reception quality provided for the transmission or from a central network element such as a base station, or can be generally specified to the receiver.

The inventors also propose a communication device for the performance of such a method and a central network element which, in particular, can signal nominal emission powers, determine a reception quality of data packets and send feedback messages referring to this reception quality and/or allow for the behavior of the communication terminal (e.g. when deciding on future resource allocations).

BRIEF DESCRIPTIONS OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

For each transmitted data packet, a specific total energy or nominal energy is particularly required in order to be able to correctly process the data packet with a specified probability. This total energy can be by a single transmission with a high emission power or several transmissions with a low emission power. In the first case, a slight delay results until the specified probability is achieved but interference, mainly unwanted, must be allowed for at the same time because of the high emission power. Meeting the "total energy condition" with only a single transmission must therefore only be considered where there are high quality requirements, especially a requirement for a short delay. In the second case, less interference with a concomitant greater delay results. The multiple transmission is thus considered if the quality requirements are not so high. By optimizing the emission power for the transmissions, an optimum profile can be found that represents the best possible compromise between reception probability and delay, and also generated interference. In general, the requirements for different services can vary so that the optimum emission power depends both on the transmitting service and on the transmission (or transmission number, i.e. first transmission, second transmission, third transmission etc).

Furthermore, the environment in which the application can be applied is described before a description of the illustrations.

A transmission of data packets takes place in a radio system between a mobile station as the transmitter and a base station as the receiver.

A radio system or communication network or communication system is a structure for the exchange of data. This can, for example, be a cellular mobile radio network such as GSM (Global System of Mobile Communications) network or the UMTS (Universal Mobile Telecommunications System).

The radio system includes at least two connecting nodes, i.e. this term also includes point-to-point connections. In a radio system, mobile stations are generally provided that connect to each other via a radio interface. In the UMTS, the radio system has at least base stations which are also referred to here as node B, as well as radio network controllers (RNC) for connecting the individual base stations. The terrestrial radio access network or Universal Terrestrial Radio Access Network UTRAN is the technical radio part of a UMTS network, in which for example the radio interface is also provided. A radio interface is always standardized and defines the totality of the physical specification and protocols for the data exchange, for example the modulation procedure, the bandwidth, the frequency swing, access procedure, security procedures and also the switching techniques. The UTRAN therefore includes at least base stations and also at least one RNC.

Base stations are, in addition to RNCs etc, to be regarded as central units in a communication network that in the case of a cellular mobile radio network serve mobile stations or communication devices within a cell, for example the first cell or the second cell, via one or more radio channels. The base station provides the air interface between base station and mobile station, for which purpose it includes at least one transmitter and/or receiver unit.

A communications device, especially a mobile station or terminal, can be any communication terminal through which a user communicates in a radio system FS. This, for example, includes mobile radio terminals, such as mobile telephones or mobile computers with a radio module. In UMTS, a mobile station is also often referred to as user equipment.

In mobile radio a distinction is made between two connection directions. The downward connection or downlink (DL) designates the direction of transmission from the base station to the mobile station. The opposite direction, the upward connection or uplink (UL), designates the opposite direction of transmission from the mobile station to the base station.

In wideband transmission systems, such as a UMTS mobile radio network, a channel is a part area of an available total transmission capacity, e.g. a frequency range. In the context of this application, a radio channel or channel is called a wireless communication path.

In a mobile radio system, for example UMTS, two types of channels are provided for data transmission, i.e. dedicated channels and common channels. With dedicated channels, a physical resource is reserved purely for the transmission of information for a specific mobile station. With common channels, information can be transmitted that is intended for all terminals, such as the primary common physical control channel PCCPCH in the downlink or else all mobile stations share this physical resource.

The E-DCH through which a mobile station UE may send data to the base station when it receives a transmission permission from the base station can be regarded as a type of mixed form. The E-DCH is on the one hand a dedicated channel because it connects precisely one mobile station with one or more base stations. On the other hand a transmission permission is provided by the base station, as in the case of a common channel. This is necessary so that the signal level at the base station does not become so high that it cannot properly decode signals received from the different mobile stations.

The following description now refers to the exemplary embodiments.

In a case where a packet transmission with a scaled emission power is negatively confirmed by the base station (a NACK (Not ACKnowledge) is transmitted from the base station to the mobile station), then the packet is retransmitted at a higher power (energy) than the nominal power, at least if this is possible on the basis of the new conditions during the retransmission. It has already been proposed to send retransmissions at a lower energy than the first transmission. In this case, it is very possible that there is no limitation of the emission power during the retransmission but a change in the channel status that can also mean that scaling is no longer necessary in the retransmission, even that the packet energy can be adapted according to the scaling in the first transmission. The object is to make sure that the total energy from the scaled transmission and the retransmission at the receiver (base station) is equal to the total energy without scaling. The remaining residual error rate after receipt of the retransmission then corresponds to the intended target rate (the residual error rate after the second transmission is then exactly the same size as if no scaling had taken place during the first transmission and the second transmission had been sent with the nominal power).

It is therefore ensured that the sum of the total energy at the receiver from the first transmission and retransmission when scaling has taken place is equal to the total energy without scaling. The remaining residual error rate after a packet transmission with scaling and "packet energy adaptation" after NACK therefore corresponds to the residual error rate of a transmission as if no scaling had taken place.

FIG. 1 shows a HARQ operation at the limit of emission power with energy correction when a HARQ is used with retransmission power reduction and chase combining.

A HARQ operation is a packet-oriented data transmission which is confirmed by a suitable confirmation, an acknowledge or ACK if correctly received and a not acknowledge or NACK if not correctly received. Furthermore, a forward error correction (FEC) which, for example, is realized by a convolution coding or turbo coding takes place.

Retransmission power reduction means that a reduction in the emission power takes place for the transmission following the first transmission. This means however that for correct decoding of a received data packet this must be received at the receiver with a certain total energy. The total emission power is therefore no longer to be used for the succeeding transmission if the decoding takes place using different received versions of the received data packet. The latter is known as chase combining. The procedure is, of course, not limited to the chase combining example, but can also be used for other procedures such as incremental redundancy or full incremental redundancy.

The packet transmission of a transmitter in a case where no scaling is necessary is shown in the upper section 1 of FIG. 1. In this case, the expended energy for a transmission is shown as a rectangle.

The center section 2 of the illustration shows the packet transmission of a transmitter that has to be scaled because of the limits of the emission power. The rectangle in the illustration again corresponds to the energy.

In the lower section 3, the energy 1 EE is shown in the soft buffer of the receiver for a case without scaling where the energy 1 ES corresponds to the first transmission of the data packet at the receiver end.

Furthermore, the energy 2EE that represents the received proportion of the energy 2ES in a case where there is scaling is shown in the soft buffer of the receiver.

It can be seen that due to the scaling, the energy in the soft buffer of the receiver after receipt of the first transmission is less in case b) than in case a).

According to one embodiment, a power correction takes place with the result that after retransmission the energy in the soft buffer of the receiver is the same in case c) without original scaling (case a) and in case d) with original scaling (case b) and corresponds to the intended target energy.

In case c) a power control takes place here that on the one hand increases the energy 1ES and d1ES, in that the energy d1Es is used for the packet during the first retransmission. This means that the target energy ETotal as a total of d1EE and 1EE is achieved.

In case d) the energy ES is reduced by scaling during the first transmission is added to the energy d1ES during the retransmission for the repeated data packet. This means that in total the energy ETotal as the total of 2EE, d1EE, EE again results at the receiver end.

The method described above offers the following advantages for a data transmission method in the case of power scaling.

Equalization in a succeeding retransmission of the energy missing due to scaling The residual error rate, i.e. the probability that a packet still cannot be correctly received even after receipt of the retransmission, also corresponds in the case of scaling to the intended target residual error rate.

Prevention of a rise of higher layer retransmissions due to the power scaling. Higher layer retransmissions are necessary even if no error-free reception is possible after a maximum number of retransmissions. Then, higher layers typically initiate a repeat of a larger data block, which is substantially more expensive than a repeat of a (part) packet at layer 1 level.

Reduction in the transmission delay arising due to the power scaling

Figure 2:
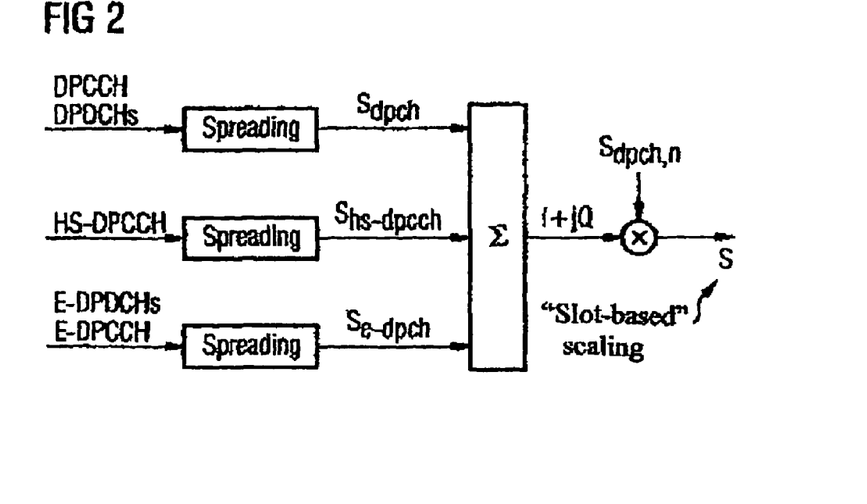
FIG. 2: A summing up and scrambling of the transmitted signal in the communication device or terminal, with a scaling of several signals taking place according to a common modulation.

Embodiments in a UMTS system are explained in FIG. 2.

FIG. 2 shows the generation of the UMTS transmitted signal in the terminal, as it is particularly described in specification 25.213 v6.1.0 (version 6.1.0), in which the introduction of E-DCH for Release 6 is described. The DPCCH, one or more DPDCHs, the HS-DPCCH and one or more E-DP-DCHs are shown summed as in FIG. 2.

A) According to a first embodiment, a scaling S, which in this case is time-slot based, takes place after a summing up and common modulation.

Figure 3:
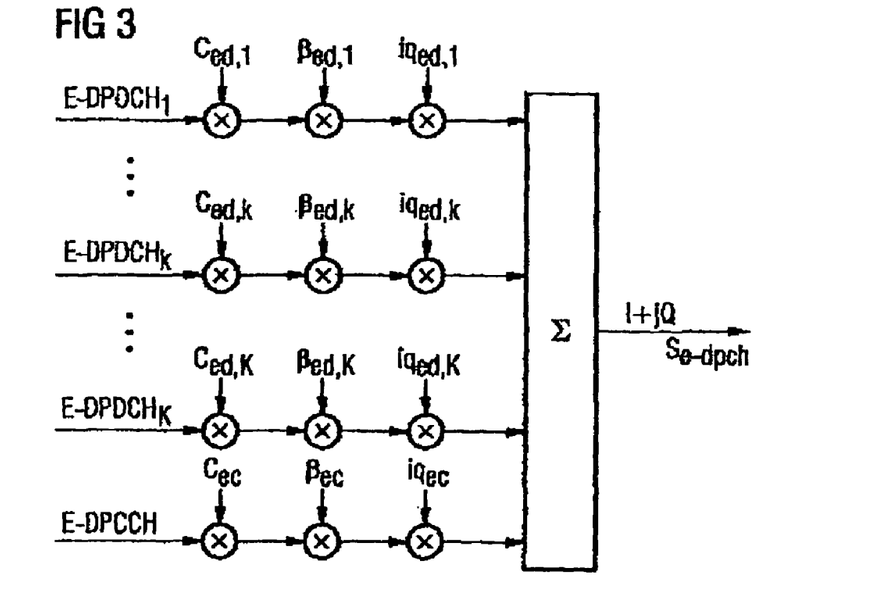
FIG. 3: A spreading followed by separate scaling of the E-DPCCH and of the E-DPDCH
Figure 4:
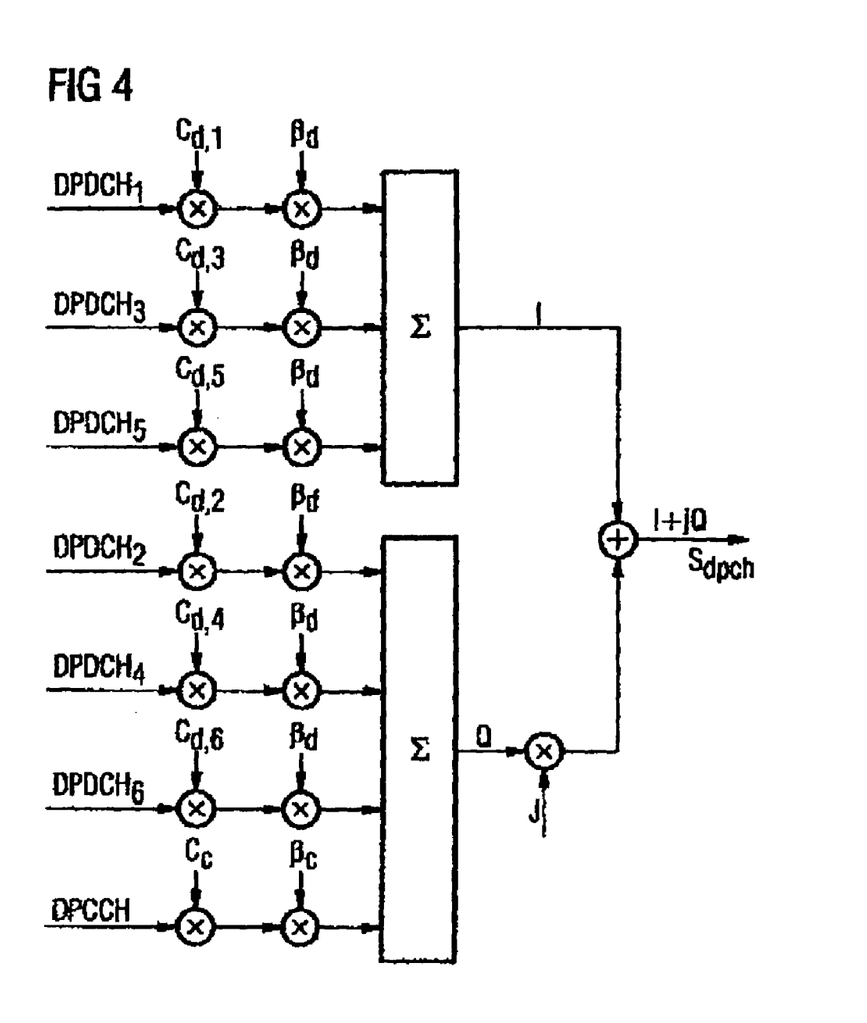
FIG. 4: A spreading followed by separate scaling of the DPPCH and the DPDCH
Figure 5:
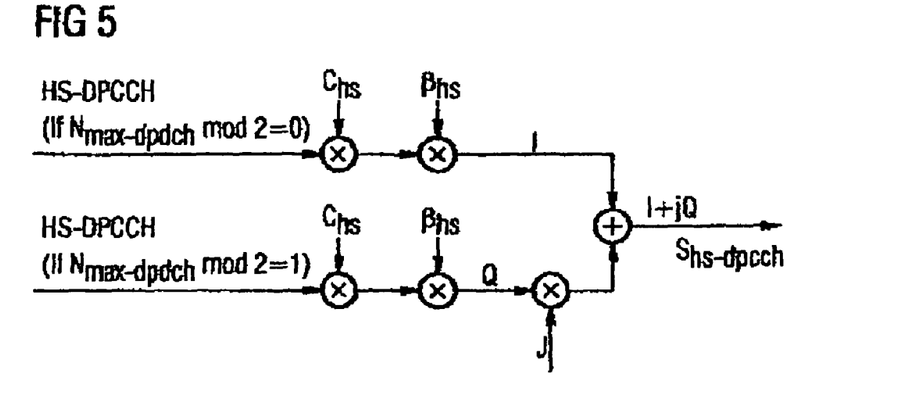
FIG. 5: A spreading followed by separate scaling of the DPCCH and the DPDCH

The spreading, not shown in detail in FIG. 2, is shown in FIGS. 3 to 5 for DCH, HS-DPCCH and E-DCH. With slot-based scaling, the power of the transmitter signal S is scaled using a constant factor $\beta$. According to a first embodiment, the ratios of the amplification factors in the individual branches ($\beta_{hs}$, $\beta_d$, and $\beta_{ed,k}$ to $\beta_c$) do not change in this case, i.e. a scaling takes place only after the common modulation, as shown in FIG. 2.

B) According to a further embodiment, a scaling takes place at the E-DCCH-TT1 limit (E-DCH TTI based scaling), with a correction taking place as explained in the following.

Data is present with a specific transport format

The emission power required for the transport format already present is higher at the transmission timepoint than the maximum power available in the terminal for the E-DP-PCH(s).

Due to the TTI-based scaling, reduced (lower) $\beta$ values $\beta_{ed,k,s}$ are used, e.g. during the first transmission of a packet, instead of the $\beta_{ed,k}$ values explicitly signaled or calculated (from signaled reference values). The reduction in this case is chosen so that the transmitted power limit is not exceeded when the reduced β values are used.

If retransmission becomes necessary, too little transmitted energy in the first transmission is considered. The corresponding corrected β values for the repetition $\beta_{ed,k,korr}$ are calculated as follows (in the following equation 1 γ is to be used only for the scaling based on E-DCH TTI).

$$\beta_{ed,k,korr}^2 = 2 \cdot \beta_{ed,k}^2 - \gamma \cdot \beta_{ed,k,s}^2$$

or $$\beta_{ed,k,korr} = \sqrt{2 \cdot \beta_{ed,k}^2 - \gamma \cdot \beta_{ed,k,s}^2}$$

If in the event of further retransmission, the energy missing due to the scaling in the previous transmissions is taken into account, the following corrected β value results for the nth transmission=(n-1)-th repetition (we start with the counting method where the 0th transmission is the starting transmission):

$$\beta_{ed,k,korr,0}^2 = \beta_{ed,k,0}^2 \text{ where } n = 0$$

$$\beta_{ed,k,korr,n}^2 = \beta_{ed,k,n}^2 + \sum_{i=1}^{n-1} (\beta_{ed,k,korr,i}^2 - \gamma_i \cdot \beta_{ed,k,s,i}^2) \text{ where } n > 0$$

or $$\beta_{ed,k,korr,0}^2 = \beta_{ed,k,0}^2 \text{ where } n = 0$$

$$\beta_{ed,k,korr,n} = \sqrt{\beta_{ed,k,n}^2 + \sum_{i=0}^{n-1} (\beta_{ed,k,korr,i}^2 - \gamma_i \cdot \beta_{ed,k,s,i}^2)} \text{ where } n > 0$$

This can also be iteratively shown $$\beta_{ed,k,korr,0}^2 = \beta_{ed,k,0}^2$$

$$\beta_{ed,k,korr,1}^2 = \beta_{ed,k,1}^2 + \beta_{ed,k,korr,0}^2 - \gamma_0 \cdot \beta_{ed,k,s,0}^2$$

$$\beta_{ed,k,korr,2}^2 = \beta_{ed,k,2}^2 + \beta_{ed,k,korr,1}^2 - \gamma_1 \cdot \beta_{ed,k,s,1}^2$$

etc.

$$\beta_{ed,k,korr,n}^2 = \beta_{ed,k,n}^2 + \beta_{ed,k,korr,n-1}^2 - \gamma_{n-1} \cdot \beta_{ed,k,s,n-1}^2$$

This formula can be interpreted in the following manner: the nominal emission power plus the difference between the previous effective emission power used and the previous defined power is used as the applied emission power.

A further embodiment is to make an approximation of the root in the above iterative process by a series development, or even to use a linear approximation, e.g.

$$\sqrt{1+x} \approx 1 + \frac{x}{2}:$$

$$\beta_{ed,k,korr,0} = \beta_{ed,k,0}$$

$$\beta_{ed,k,korr,1} = \beta_{ed,k,1} + \frac{\beta_{ed,k,korr,0}^2 - \gamma_{i-1} \cdot \beta_{ed,k,s,0}^2}{2 \cdot \beta_{ed,k,1}}$$

$$\beta_{ed,k,korr,2} = \beta_{ed,k,2} + \frac{\beta_{ed,k,korr,1}^2 - \gamma_{i-1} \cdot \beta_{ed,k,s,1}^2}{2 \cdot \beta_{ed,k,2}} \text{ etc.}$$

$$\beta_{ed,k,korr,n} = \beta_{ed,k,n} + \frac{\beta_{ed,k,korr,n-1}^2 - \gamma_{n-1} \cdot \beta_{ed,k,s,n-1}^2}{2 \cdot \beta_{ed,k,n}}$$

This progressive development therefore particularly brings advantages because the exact calculation of the root requires a very expensive algorithm. The β value must, however, be calculated very frequently, i.e. for every time slot. Furthermore, there is very little time available for the calculation because it cannot be performed until the power control command has been received. Furthermore, it has to be considered that the β value is only used quantisized and that the multiplications with these values must be carried out in fact once or several times per chip (a chip is the time duration after the spreading). The loss of accuracy due to this discretizing is generally greater that the loss of accuracy due to the approximation of the root function.

C) According to a further exemplary embodiment, scaling takes place in the TTI (slot-based scaling) with correction, as described in the following.

Within a transmission block (E-DCH TTI) the power limit of the mobile station is reached in at least one slot and slot-based scaling is carried out.

Figure 6:
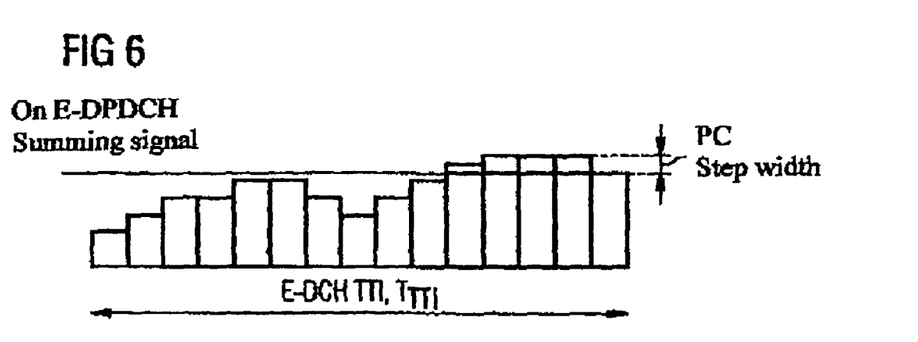
FIG. 6: An E-DCH summing signal, with the transmitter transmitting at the limit of the emission power via a "time transmission interval" TTI as a time interval.

FIG. 6 shows the behavior of a UE at the emission power limit for slot-based scaling. Due to the power control, the E-DCH UE emission power limit is exceeded in slot 11. The transmission portion that is correspondingly scaled, i.e. the portion that is not sent, is shown highlighted. Strictly speaking, the mobile station in such a case does not exactly know the extent of the too little power it transmits with, only that it is transmitted with too little power.

The required power is estimated by a step width of the power control. This is mainly a conservative estimation, i.e. generally the power is actually too low by a greater amount.

Determination of the ratio of the packet energy received at the base station with scaling to at least the packet energy received at the base station without scaling:

$$\gamma = \frac{N_{TTI}}{N \cdot \alpha + (N_{TTI} - N)}$$

Because the packet energy received at the base station without scaling can only be estimated, it is also possible to allow for this in the γ factor by the correction factor K as follows:

$$\gamma = \frac{K}{\frac{N}{N_{TTI}}(\alpha - 1) + 1}$$

where $0 < K \leq 1$

N Number of time slots that are scaled

α Step width of the fast power control (linear, i.e. the power after application of a step to increase the power has a ratio to the power before the step of 1:α, i.e. a>1).

With the usual 1 dB steps α=1.26.

$N_{TTI}$ Number of time slots of an E-DCH TTI

K Correction factor

Balance of the energy in the retransmission by correction of the β values as described in B), although with the factor y calculated here and $\beta_{ed,k,s,i} = \beta_{ed,k,i}$, In this case, $\gamma_0$ refers to the slot-based scaling performed in the starting transmission and $\gamma_1$ refers to the slot-based scaling performed in the first retransmission, etc.

D) According to a different exemplary embodiment scaling takes place both at the TTI limit (E-DCH TTI-based scaling) and in the TTI (slot-based scaling) with correction, as follows:

This exemplary embodiment combines the allowance made for both scalings, i.e. it is a combination of the two previous exemplary embodiments.

Data with a specific transport format is present (i.e. the amount of the data in the transmission block is present), the emission power required at the transmission timepoint is greater than the maximum available E-DPDCH power.

In addition, the power limit of the mobile station is achieved within a transmission block (E-DCH TTI) in at least one slot and slot-based scaling is performed.

Balancing of the energy as described in B) and with the γ factors as described in C)

E) According to a further exemplary embodiment, a limitation of the scaling to maximum values takes place as follows:

Especially in a case where several transmission, i.e., for example, the first transmission and one or more retransmissions have to be scaled, it can be that by allowing for the previous scaling the β value is relatively strongly increased for the current transmission, e.g. by more than 3 dB. Although such a high increase is in principle then necessary in order to reach the nominal error rate, transmission at very high power also has disadvantages: it generates increased interference for other transmissions that also would perhaps not have been predicted there. Furthermore, the transmission energy is then mainly far too great in the sense that in a large number of cases a distinctly lower energy would have been sufficient for a successful transmission. The surplus part of the energy would then have been uselessly expended.

In this case, it can be provided that the power or the β values are increased by a maximum of a certain amount (or a maximum factor) compared to the nominal values. The applied β value is thus calculated from the maximum of this maximum value and the value calculated according to a preceding exemplary embodiment.

Note: Especially in this case the error will not be very noticeable due to the approximation of the root because the deviation from the nominal β value will be very small and the approximation $$\sqrt{1+x} \approx 1 + \frac{x}{2}$$

for small x has only a small error.

The following should also be noted. Mobile stations are subject not only to limitations with regard to the maximum emission power but also with regard to the minimum emission power, i.e. the mobile station must always transmit with a certain minimum power even if the base station signals that the power should be reduced. The reason for this is that elements of the signal generation cannot be cost-effectively constructed with just any dynamics. For example, the dynamics of a digital-analog converter are limited. In this case, scaling of the complete signal is likewise performed but naturally only to the (then higher) minimum power. In the present case it was always assumed with the exemplary embodiments that too little energy was applied. The formula and methods can then, of course, also be used if too much energy was applied.

However, in a further preferred exemplary embodiment a distinction is made between whether too much or too little energy was applied. If too little energy was applied, the correction is carried out as described. If, however, too much energy was applied, the correction is either not carried out or carried out only to a lesser degree. This suggestion, which at first seems inappropriate, can be justified in that although for example the first transmission was sent with too much energy, the question of energy for the retransmission arises only if the previous transmission could not be carried out successfully. In this case, even the too high energy would then not have been sufficient to correctly transmit the packet. It is then pointless to provide too little energy for the retransmission. This can particularly be seen if one considers a special case, e.g. where it can be that so much energy was already applied for the first transmission as was provided for the first transmission and the next transmission. In this case, the repeat transmission would be sent with energy 0 if the correction were applied, which of course would be pointless. In this case, therefore, no reduction of the transmitter-power/energy to 0 should take place but instead transmission should be sent with a certain minimum power. Advantageously, a procedure similar to the above procedure for limiting the correction can be used, except that in this case a limitation of the correction to a certain minimum is to be applied, i.e. the emission power is chosen as a maximum of a specified minimum power and of the power reduced taking account of the too high emission power transmitted in the previous transmission.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for transmitting data packets in a radio system between a transmitter and a receiver, comprising:
    determining a specified nominal emission power for a data packet relative to a required reception quality;
    transmitting the data packet with a first effective emission power, the first effective emission power being the nominal emission power or an emission power deviated from said nominal emission power due to certain boundary conditions;
    when the first effective emission power is less than the specified nominal emission power,
        deriving a new nominal emission power by adding the difference between the first effective emission power and the specified nominal emission power to the specified nominal emission power;
        retransmitting the data packet with a second effective emission power, the second effective emission power being the new nominal emission power or an emission power deviated from the new nominal emission power due to certain boundary conditions; and
        repeating the deriving and retransmitting until the effective applied emission power is equal to the specified nominal emission power; and
    when the first effective emission power is greater than or equal to the specified nominal emission power, retransmitting the data packet with the specified nominal emission power.

2. The method as claimed in claim 1, further comprising:
    transmitting the data packet during a time interval;
    dividing the time interval into several time slots;
    sending a power control feedback from the receiver of the data packet to the transmitter for each time slot, which indicates whether a power control of the emission power should take place and the new nominal emission power to be derived for a succeeding time slot taking account of the effective applied emission power for the data share in the time slot.

3. The method as claimed in claim 1, further comprising:
providing a reception quality for reception at the receiver for each data packet for each transmission; and
defining the nominal emission power specified in the succeeding transmission according to the reception quality provided for the transmission.

4. The method as claimed in claim 1, further comprising:
providing a maximum emission power for the transmission of a data packet and a deviation of the effective emission power from the nominal emission power being necessary if the maximum emission power is exceeded.

5. The method as claimed in claim 4, wherein:
for the derivation, the effective emission power chosen for time slots in which the power control does not lead to the maximum emission power being exceeded is equal to the nominal emission power, and
in time slots in which the power control would lead to the maximum emission power being exceeded, the effective emission power is less than the nominal power by a predetermined ratio.

6. The method as claimed in claim 5, comprising further:
controlling power in specified step widths, in which the predetermined ratio corresponds to a power control step width.

7. The method as claimed in claim 1, further comprising:
providing several data transmission channels;
transmitting data in the several data transmission channels in common data packets; and
setting a nominal emission power after a common modulation of the data in the data packets.

8. The method as claimed in claim 1, further comprising:
providing several data channels;
transmitting data in the several data channels in common data packets; and
setting a nominal emission power before the individual data transmission channels are combined.

9. The method as claimed in claim 1, wherein retransmission takes place on request.

10. The method as claimed in claim 1, further comprising:
transmitting the data packet during a time interval;
dividing the time interval into several time slots;
sending a power control feedback from the receiver of the data packet to the transmitter for each time slot, which indicates whether a power control of the emission power should take place and the new nominal emission power to be derived for a succeeding time slot taking account of the effective applied emission power for the data share in the time slot.

11. The method as claimed in claim 10, further comprising:
providing a reception quality for reception at the receiver for each data packet for each transmission; and
defining the nominal emission power specified in the succeeding transmission according to the reception quality provided for the transmission.

12. The method as claimed in claim 11, further comprising:
providing a maximum emission power for the transmission of a data packet and a deviation of the effective emission power from the nominal emission power being necessary if the maximum emission power is exceeded.

13. The method as claimed in claim 12, wherein:
for the derivation, the effective emission power chosen for time slots in which the power control does not lead to the maximum emission power being exceeded is equal to the nominal emission power, and
in time slots in which the power control would lead to the maximum emission power being exceeded, the effective emission power is less than the nominal power by a predetermined ratio.

14. The method as claimed in claim 13, comprising further:
controlling power in specified step widths, in which the predetermined ratio corresponds to a power control step width.

15. The method as claimed in claim 14, further comprising:
providing several data transmission channels;
transmitting data in the several data transmission channels in common data packets; and
setting a nominal emission power after a common modulation of the data in the data packets.

16. The method as claimed in claim 15, further comprising:
providing several data channels;
transmitting data in the several data channels in common data packets; and
setting a nominal emission power before the individual data transmission channels are combined.

17. The method as claimed in claim 16, wherein retransmission takes place on request.

18. A transmitter for a radio system with a transmitter/receiver unit for transmitting or receiving data and with a processor unit which is configured to perform the following steps:
determining a specified nominal emission power for a data packet relative to a desired reception quality;
transmitting the data packet with a first effective emission power, the first effective emission power being the nominal emission power or an emission power deviated from said nominal emission power due to certain boundary conditions;
when the first effective emission power is less than the specified nominal emission power,
deriving a new nominal emission power by adding the difference between the first effective emission power and the specified nominal emission power to the specified nominal emission power;
retransmitting the data packet with a second effective emission power, the second effective emission power being the new nominal emission power or an emission power deviated from the new nominal emission power due to certain boundary conditions; and
repeating the deriving and retransmitting until the effective applied emission power is equal to the specified nominal emission power; and
when the first effective emission power is greater than or equal to the specified nominal emission power, retransmitting the data packet with the specified nominal emission power.

19. A radio system with at least one transmitter as claimed in claim 18 and a central network element with a transmitter/receiver unit for sending or receiving data, and a processor unit configured for performing the following steps:
receiving data packets;
checking data packets with respect to their reception quality; and sending a feedback message regarding reception quality to a transmitter of the data packet.

20. The radio system as claimed in claim 19, wherein the central network element is configured as a base station.

21. A central network element with a transmitter/receiver unit for sending or receiving data, and a processor unit configured for performing the following steps:

determining a specified nominal emission power for a data packet relative to a desired reception quality;

transmitting the data packet with a first effective emission power, the first effective emission power being the nominal emission power or an emission power deviated from said nominal emission power due to certain boundary conditions;

when the first effective emission power is less than the specified nominal emission power, deriving a new nominal emission power by adding the difference between the first effective emission power and the specified nominal emission power to the specified nominal emission power;

retransmitting the data packet with a second effective emission power, the second effective emission power being the new nominal emission power or an emission power deviated from the new nominal emission power due to certain boundary conditions; and repeating the deriving and retransmitting until the effective applied emission power is equal to the specified nominal emission power and when the first effective emission power is greater than or equal to the specified nominal emission power, retransmitting the data packet with the specified nominal emission power.

22. The central network element as claimed in claim 21, wherein the central network element is configured as a base station.

23. A radio system with at least one transmitter as claimed in claim 18 and a central network element as claimed in claim 21.

* * * * *